United States Patent Office 3,280,113
Patented Oct. 18, 1966

3,280,113
ANDROSTANO[2,3-b]PYRAZINES AND PIPERAZINES
Robert G. Christiansen, Schodack, and Raymond O. Clinton, East Greenbush, N.Y., assignors to Sterling Drug Inc., New York, N.Y., a corporation of Delaware
No Drawing. Filed Oct. 14, 1965, Ser. No. 496,168
5 Claims. (Cl. 260—239.5)

This invention relates to new heterocyclic substituted steroids, and particularly is concerned with androstano[2,3-b]pyrazines and hydrogenated derivatives thereof.

The compounds of the invention are of the following general structures:

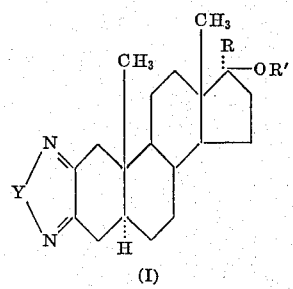

(I)

or

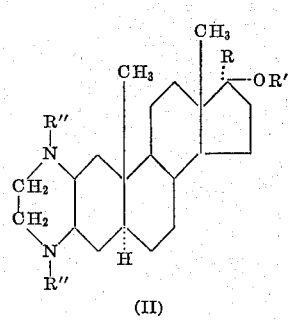

(II)

wherein R is hydrogen or lower-alkyl, R' is hydrogen or carboxylic acyl having from one to twelve carbon atoms, R" is hydrogen, lower-alkyl or carboxylic acyl having from one to twelve carbon atoms, and Y is CH₂CH₂ or CH=CH.

When R or R" in the above formulas is lower-alkyl, it stands for a lower-alkyl group having from one to four carbon atoms, thus including methyl, ethyl, propyl, isopropyl, butyl, isobutyl, secondary-butyl and tertiary-butyl.

When R' or R" in the above formulas is carboxylic acyl having from one to twelve carbon atoms, it stands for an acyl radical derived from a carboxylic acid having from one to twelve carbon atoms and a molecular weight less than about 250. Representative of the lower-carboxylic acyl radicals which can be present are lower-alkanoyl, e.g., acetyl, propionyl, isobutyryl, caproyl, heptanoyl, octanoyl, dodecanoyl, trimethylacetyl, and the like; cycloalkyl-lower-alkanoyl wherein cycloalkyl has 5–6 ring members, e.g., β-cyclopentylpropionyl, β-cyclohexylpropionyl, and the like; benzoyl; phenyl-lower-alkanoyl or -alkenoyl, e.g., phenylacetyl, β-phenylpropionyl, cinnamoyl, and the like; phenoxy-lower-alkanoyl, e.g., p-chlorophenoxyacetyl; and pyridylcarbonyl, e.g., nicotinoyl and isonicotinoyl. In acyl radicals containing a phenyl group, the benzene ring thereof can be unsubstituted or substituted by any number and kind of substituents inert under the reaction conditions used, including lower-alkyl, for example p-tolyl; lower-alkoxy, for example 3,4-dimethoxyphenyl; halogen (including fluorine, chlorine, bromine and iodine), for example 2-bromophenyl; and nitro, for example p-nitrophenyl. The lower-alkyl and lower-alkoxy groups can have from one to four carbon atoms.

The compounds of Formula I wherein Y is CH₂CH₂ are prepared by reacting with ethylenediamine an androstane-2,3-dione compound of the formula

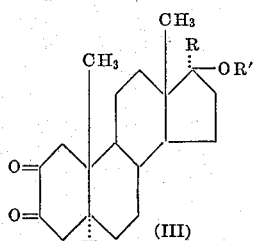

(III)

wherein R and R' have the meanings given hereinabove. The reaction between ethylenediamine and a compound of Formula III takes place in an inert organic solvent at a temperature between about 50° C. and 150° C. with means for removing the water formed during the reaction.

The compounds of Formula I wherein Y is CH=CH are prepared by aromatization of the corersponding compounds are prepared by aromatization of the corresponding compounds wherein Y is CH₂CH₂. The aromatization can be effected by heating the dihydropyrazine (I, Y is CH₂CH₂) with a solution of an alkali metal hydroxide in a lower-alkanol, for example potassium hydroxide in methanol.

The piperazine compounds of Formula II wherein R" is hydrogen are prepared by catalytic hydrogenation of the corresponding dihydropyrazine compounds of Formula I wherein Y is CH₂CH₂.

The compounds of Formulas I and II wherein R' is carboxylic acyl are prepared from the corresponding compounds wherein R' is hydrogen by reacting the latter with the appropriate acid anhydride or acid halide. The ester moiety may, if desired, be present in the 2,3-dione starting material of Formula III, prior to the formation of the dihydropyrazine ring.

The compounds of Formula II wherein R" is carboxylic acyl are prepared from the corresponding compounds wherein R" is hydrogen by reacting the latter with the appropriate acid anhydride or acid halide.

The compounds of Formula II wherein R" is lower-alkyl are prepared by reduction of the corresponding compounds wherein R" is lower-alkanoyl. The reduction is most readily effected by lithium aluminum hydride.

The compounds of Formulas I and II, except those of Formula II where R" is carboxylic acyl, are basic in character and form acid-addition salts with strong acids. Said acid-addition salts, also within the purview of the invention, are the full equivalent of the corresponding free bases insofar as their physiological properties are concerned.

The structures of the compounds of the invention were established by the methods of synthesis, by their chemical and physical properties, including ultraviolet and infrared spectra, and by elementary analysis.

Pharmacological and endocrinological evaluation of the compounds of Formulas I and II have indicated the presence of useful properties, for example, antihypertensive, anti-estrogenic and growth promoting activities. They are effective in doses of 10–200 mg./kg. and can be prepared for use in the manner employed for other physiologically active steroidal substances.

The following examples will further illustrate the invention without the latter being limited thereby.

EXAMPLE 1

17β - hydroxy - 17α - methyl - 5α - androstano[2,3-b]-5,6-dihydropyrazine [I; R is CH₃, R' is H, Y is CH₂CH₂]:

A mixture of 6.36 g. of 17α-methyl-5α-androstane-2,3-dione-17β-ol, 12.0 g. of ethylenediamine and 100 ml. of benzene was refluxed under a water separator. After one hour of heating, 1.2 ml. of water had been collected, and the solvent was removed by distillation at reduced pressure. The residue was triturated with ethyl acetate to give 5.88 g. of 17β-hydroxy-17α-methyl-5α-androstano[2,3-b]-5,6-dihydropyrazine, yellowish-white prisms, M.P. 201.0–212.8° C. (corr.), $[\alpha]_D^{25} = +167.1°$ (1% in chloroform).

By replacing the 17α-methyl-5α-androstane-2,3-dione-17β-ol by a molar equivalent amount of 5α-androstane-2,3-dione-17β-ol, there can be obtained 17β-hydroxy-5α-androstano[2,3-b]-5,6-dihydropyrazine [I; R and R' are H, Y is $CH_2CH_2$]. The latter can be caused to react in pyridine solution with acetic anhydride, caproyl chloride, β-cyclohexylpropionyl chloride, p-nitrobenzoyl chloride, β-phenylpropionyl chloride, cinnamoyl chloride, p-chlorophenoxyacetyl chloride or nicotinoyl chloride to afford, respectively, 17β-acetoxy-5α-androstano[2,3-b]-5,6-dihydropyrazine, 17β - caproyloxy - 5α - androstano[2,3-b]-5,6- dihydropyrazine, 17β -(β - cyclohexylpropionyloxy) - 5α- androstano[2,3 - b] - 5,6 - dihydropyrazine, 17β-(p-nitrobenzoyloxy) - 5α - androstano[2,3 - b] - 5,6 - dihydropyrazine, 17β - (β - phenylpropionyloxy) - 5α - androstano[2,3 - b] - 5,6 - dihydropyrazine, 17β - cinnamoyloxy-5α - androstano[2,3 - b] - 5,6-dihydropyrazine, 17β-(p-chlorophenoxyacetoxy) - 5α - androstano[2,3 - b] - 5,6- dihydropyrazine, or 17β - nicotinoyloxy - 5α - androstano [2,3-b]-5,6-dihydropyrazine.

EXAMPLE 2

17β - hydroxy - 17α - methyl - 5α - androstano[2,3-b] pyrazine [I; R is $CH_3$, R' is H, Y is CH=CH]: A mixture of 17β - hydroxy - 17α - methyl - 5α - androstano[2,3-b]-5,6-dihydropyrazine (derived from 5.76 g. of 17α-methyl-5α-androstane-2,3-dione-17β-ol according to the method of Example 1), 10.0 g. of potassium hydroxide and 300 ml. of methanol was refluxed for 40 hours. Acetic acid was added until the solution was slightly acidic, and the mixture was concentrated in vacuo to dryness. Water was added to the residue, followed by dilute sodium hydroxide solution until the mixture was slightly basic. The solid product was collected by filtration, washed with water, dried at 70° C. in vacuo, and chromatographed on a column of 150 g. of neutral alumina, prewet with 50 ml. of methylene dichloride. The column was eluted with methylene dichloride and with methylene dichloride containing 10–20% ether, and the product then recrystallized three times from acetonitrile to give 17β-hydroxy-17α-methyl-5α-androstano[2,3 - b]pyrazine, colorless rods, M.P. 197.6–198.8° C., $[\alpha]_D^{25} = +47.2°$ (1% in chloroform); ultraviolet maxima at 274, 279 and 302 m$\mu$ ($\epsilon$=8450, 8990, 1570).

By replacing the 17β-hydroxy-17α-methyl-5α-androstano[2,3 - b] - 5,6 - dihydropyrazine in the foregoing preparation by a molar equivalent amount of 17β-hydroxy-5α - androstano[2,3 - b] - 5,6 - dihydropyrazine there can be obtained 17β - hydroxy - 5α - androstano[2,3 - b]pyrazine [I; R and R' are H, Y is CH=CH].

EXAMPLE 3

17β - hydroxy - 17α - methyl - 5α - androstano[2,3-b] piperazine [II; R is $CH_3$, R' and R" are H]: A solution of 1.71 g. of 17β-hydroxy-17α-methyl-5α-androstano [2,3-b]-5,6-dihydropyrazine (Example 1) in 200 ml. of ethanol was hydrogenated in the presence of 0.5 g. of Adams' platinum oxide catalyst. The reaction mixture was filtered and the filtrate concentrated at reduced pressure. The residue was recrystallized twice from ethanol to give 17β - hydroxy - 17α - methyl - 5α - androstano [2,3-b]piperazine, colorless prisms, M.P. 196.8–202.6° C. (corr.), $[\alpha]_D^{25} = +21.8°$ (1% in chloroform); infrared absorption at 2.96, 5.77, 6.15 and 6.90$\mu$.

By replacing the 17β - hydroxy - 17α - methyl - 5α - androstano[2,3 - b] - 5,6 - dihydropyrazine in the foregoing preparation by a molar equivalent amount of 17β-hydroxy-5α - androstano[2,3 - b] - 5,6 - dihydropyrazine, there can be obtained 17β - hydroxy - 5α - androstano[2,3 - b]piperazine [II; R, R' and R" are H].

EXAMPLE 4

17β - formoxy -17α- methyl - 5α-androstano[2,3-b]-1,4-diformylpiperazine [II; R is $CH_3$, R' and R" are CHO]: A mixture of 40.8 ml. of acetic anhydride and 17.2 ml. of formic acid was heated for two hours at 50–60° C. The mixture was cooled in an ice-bath, and 8.65 g. of 17β-hydroxy - 17α -methyl - 5α-androstano[2,3-b]piperazine was added. The reaction mixture was stirred for four hours at 50° C. and two hours at 80° C. and then poured into ice-water. The product was extracted with four 100 ml. portions of methylene dichloride and with 500 ml. of ether. The methylene dichloride extracts were combined and washed with 500 ml. of water and 500 ml. of 5% sodium bicarbonate solution. The aqueous washings were back-extracted with the ether, and the methylene dichloride and ether extracts were combined, dried over anhydrous magnesium sulfate, filtered and concentrated by distillation. The residue was recrystallized from methanol (50 ml.) to give 6.72 g. of 17β-formoxy-17α-methyl-5α-androstano [2,3-b]-1,4-diformylpiperazine, which when further crystallized from ethanol was obtained in the form of pale yellow prisms, M.P. 230.8–231.8° C. (dec.) (corr.).

17β - hydroxy - 17α - methyl - 5α - androstano[2,3 - b] piperazine when heated at 100° C. with acetic anhydride in pyridine solution affords 17β-acetoxy-17α-methyl-5α-androstano[2,3-b]-1,4-diacetylpiperazine [II; R is $CH_3$, R' and R" are $CH_3CO$].

EXAMPLE 5

17β - hydroxy - 17α - methyl - 5α - androstano[2,3-b]-1,4-dimethylpiperazine [II; R is $CH_3$, R' is H, R" is $CH_3$] can be prepared by treating 17β-formoxy-17α-methyl-5α-androstano[2,3 - b] - 1,4 - diformylpiperazine with lithium aluminum hydride in tetrahydrofuran solution. By a similar procedure, 17β-acetoxy-17α-methyl-5α-androstano [2,3-b]-1,4-diacetylpiperazine can be converted to 17β-hydroxy - 17α - methyl - 5α - androstano[2,3 - b] - 1,4 - diethylpiperazine [II; R is $CH_3$, R' is H, R" is $C_2H_5$].

We claim:
1. A compound of the formula

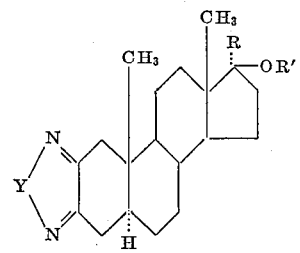

or

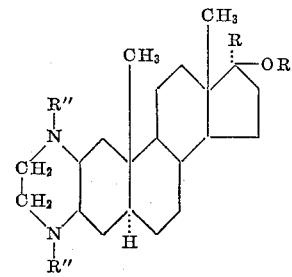

wherein R is hydrogen or lower-alkyl, R' is hydrogen or carboxylic acyl having from one to twelve carbon atoms, R" is hydrogen, lower-alkyl or carboxylic acyl having from one to twelve carbon atoms, and Y is $CH_2CH_2$ or CH=CH.

2. 17β - hydroxy - 17α - methylandrostano[2,3 - b]-5,6-dihydropyrazine.

3. 17β - hydroxy - 17α - methylandrostano[2,3 - b]pyrazine.

4. 17β - hydroxy - 17α - methylandrostano[2,3 - b]piperazine.

5. 17β - formoxy - 17α - methylandrostano[2,3 - b]-1,4-diformylpiperazine.

No references cited.

LEWIS GOTTS, *Primary Examiner.*

THOMAS M. MESHBESHER, *Assistant Examiner.*